(12) United States Patent
Venkatram et al.

(10) Patent No.: US 11,234,259 B2
(45) Date of Patent: Jan. 25, 2022

(54) MANAGING WIRELESS DEVICE COMMUNICATION WITH A BASE STATION

(71) Applicant: QUALCOMM Incorporated, San Diego, CA (US)

(72) Inventors: Karthik Venkatram, San Diego, CA (US); Ansah Ahmed Sheik, Hyderabad (IN); Daniel Amerga, San Diego, CA (US); Shanshan Wang, San Diego, CA (US); Arvind Vardarajan Santhanam, San Diego, CA (US); Ozcan Ozturk, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/929,410

(22) Filed: Jul. 15, 2020

(65) Prior Publication Data

US 2021/0037556 A1 Feb. 4, 2021

(51) Int. Cl.
*H04W 72/12* (2009.01)
*H04W 24/08* (2009.01)
(Continued)

(52) U.S. Cl.
CPC ....... *H04W 72/1273* (2013.01); *H04W 24/08* (2013.01); *H04W 48/12* (2013.01); *H04W 74/0808* (2013.01)

(58) Field of Classification Search
CPC . H04W 72/1273; H04W 24/08; H04W 48/12; H04W 74/0808; H04W 74/085
See application file for complete search history.

(56) References Cited

U.S. PATENT DOCUMENTS 10,616,822 B2 4/2020 Kubota et al.
2019/0069218 A1* 2/2019 Ribeiro ................ H04W 48/10
(Continued)

FOREIGN PATENT DOCUMENTS

EP 3419340 A1 12/2018
WO 2016130355 A1 8/2016

OTHER PUBLICATIONS

International Search Report and Written Opinion—PCT/US2020/042218—ISAEPO—dated Nov. 16, 2020.
(Continued)

*Primary Examiner* — Harry H Kim
(74) *Attorney, Agent, or Firm* — The Marbury Law Group/Qualcomm

(57) ABSTRACT

This disclosure provides systems, methods and apparatus, and computer programs encoded on computer storage media, for managing communications with a base station by a processor of a wireless device. In one aspect, a processor of a wireless device may receive from the base station a system information change indication in first system information. The processor may determine from the first system information scheduling information of second system information. The processor may determine a factor that a request for the second system information will collide with a request from another wireless device for the second system information. The processor may send the request for the second system information using the determined factor.

26 Claims, 16 Drawing Sheets

(51) Int. Cl.
  *H04W 48/12*  (2009.01)
  *H04W 74/08*  (2009.01)

(56) References Cited

U.S. PATENT DOCUMENTS

2019/0349841 A1* 11/2019 Ishii .................. H04W 48/10
2019/0394807 A1* 12/2019 Xiao .................. H04L 5/00
2021/0092672 A1*  3/2021 Jiang ................. H04W 76/19

OTHER PUBLICATIONS

ITRI: "Discussion on Indicating the Broadcast of on-demand SIBs", 3GPP Draft, 3GPP TSG-RAN WG2 Meeting #97, R2-1701345, Other SI Broadcast Indication, 3rd Generation Partnership Project (3GPP), Mobile Competence Centre, 650, Route Des Lucioles, F-06921, Sophia-Antipolis Cedex, France, vol. RAN WG2, No. Athens, Greece; Feb. 13, 2017-Feb. 17, 2017, Feb. 12, 2017 (Feb. 12, 2017), XP051212009, 3 pages, Retrieved from the Internet: URL: http://www.3gpp.org/ftp/Meetings_3GPP_SYNC/RAN2/Docs/ [retrieved on Feb. 12, 2017], paragraphs 1 to 2.2.
Partial International Search Report—PCT/US2020/042218—ISA/EPO—dated Sep. 24, 2020.
Vivo: "SI Change Notification", 3GPP Draft, 3GPP TSG-RAN WG2 Meeting #101, R2-1802090 SI Change Notification, 3rd Generation Partnership Project (3GPP), Mobile Competence Centre, 650, Route Des Lucioles, F-06921, Sophia-Antipolis Cedex, France, vol. RAN WG2, No. Athens, Greece; Feb. 26, 2018-Mar. 2, 2018, Feb. 14, 2018 (Feb. 14, 2018), XP051399095, 4 pages, Retrieved from the Internet: URL:http://www.3gpp.org/ftp/tsg%5Fran/WG2%5FRL2/TSGR2%5F101/Docs/ [retrieved on Feb. 14, 2018] paragraphs 2 and 3.

* cited by examiner

MANAGING WIRELESS DEVICE COMMUNICATION WITH A BASE STATION

RELATED APPLICATIONS

This application claims the benefit of priority to India Provisional Application No. 201941030908 entitled "MANAGING WIRELESS DEVICE COMMUNICATION WITH A BASE STATION" filed Jul. 31, 2019, the entire contents of which are hereby incorporated by reference for all purposes.

TECHNICAL FIELD

This disclosure relates generally to wireless devices, and more particularly to managing wireless devices to obtain required system information from the base station while reducing wireless link congestion.

DESCRIPTION OF THE RELATED TECHNOLOGY

A wireless base station provides certain system information (SI) that enables a wireless device to establish a communication link with the base station. SI may be provided in one or more blocks, such as a Master Information Block (MIB) or a System Information Block (SIB). In LTE systems, MIB and SIB schedules are fixed, and all SIBs are broadcast via base station. In 5G New Radio (NR) systems, to reduce over-the-air signaling, SI is divided into minimum system information (MSIB) and other system information. MSIB, such as the MIB and SIB1 messages, are broadcast periodically, and include basic information required by a wireless device to attempt initial access to a cell, and information for acquiring other system information. Some base stations may broadcast the other system information. However, some base stations may provide the other system information on-demand, such as in response to a request such information received from a wireless device.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless device. Some implementations may include receiving, from the base station, a system information (SI) change indication in first SI, determining, from the first SI, scheduling information of second SI, determining a factor that a request for the second SI will collide with a request from another wireless device for the second SI, and sending the request for the second SI using the determined factor.

In some implementations, the first SI may include one or more elements of a System Information Block 1 (SIB1) message. In some implementations, the first SI may include one or more elements of a Master Information Block (MIB) message. Some implementations may include determining whether the second SI is on-demand SI based on the first SI. In such implementations, determining the factor that a request for the second SI will collide with a request from another wireless device for the second SI may include determining the factor that a request for the second SI will collide with a request from another wireless device for the second SI in response to determining that the second SI is on-demand SI.

In some implementations, determining a factor that a request for the second SI will collide with a request from another wireless device for the second SI may include determining a random back off (RBO) time for sending a request for the second SI, and sending the request for the second SI using the determined factor may include sending the request for the second SI using the determined RBO time.

In some implementations, determining a factor that a request for the second SI will collide with a request from another wireless device for the second SI may include determining an access barring class for the wireless device, and sending the request for the second SI using the determined factor may include sending the request for the second SI according to the determined access barring class. In some implementations, determining a factor that a request for the second SI will collide with a request from another wireless device for the second SI may include determining a factor for reducing a probability that a request for the second SI will collide with a request from another wireless device for the second SI.

Another innovative aspect of the subject matter described in this disclosure may be implemented in a wireless device, which may include receiving, from a base station, network configuration information in a first system information (SI), determining, from the network configuration information in the first SI, a type of access channel request to send to the base station, sending to the base station one or more first requests for second SI based on the determined type of access channel request, determining whether an access channel request failure has occurred after sending at least one of the first requests for the second SI, determining an RBO time for sending a second access channel request based on the determined type of access channel request in response to determining that an access channel request failure has occurred, and sending to the base station the second request for the second SI based on the RBO time.

In some implementations, the type of access channel request may include one of a Message-1 single resource request, a Message-1 multiple resource request, and a Message-3 request. In some implementations, sending to the base station a number of access channel requests based on the determined type of access channel request may include sending to the base station a plurality of access channel requests based on the determined type of access channel request, and determining that an access channel request failure has occurred may include determining that an access channel request failure has occurred after sending any of the plurality of access channel requests.

Some implementations may include identifying one or more messages of the second SI that the wireless device did not receive, and sending to the base station a request for the one or more messages of the second system information that the wireless device did not receive using the RBO time. Some implementations may include determining whether a time for receiving the second SI has elapsed, and sending to the base station a third request for the second SI in response to determining that the time for receiving the second SI has elapsed.

In some implementations, determining whether an access channel request failure has occurred after sending at least one of the first requests for the second SI may include monitoring for the second SI based on the one or more first requests for the second SI and determining that the access channel request failure has occurred based on a failure to receive at least one element of the second SI. In some implementations, monitoring for the second SI based on the requests for the second SI may include monitoring for the second SI requested by another wireless device.

Another innovative aspect of the subject matter described in this disclosure can be implemented in an apparatus of a wireless device. Some implementations of a wireless device may include a first interface configured to obtain a system information (SI) change indication in first SI, and a processing system coupled to the first interface and configured to determine from the first SI scheduling information of second SI, determine a factor that a request for the second SI will collide with a request from another wireless device for the second SI, and send the request for the second SI using the determined factor.

In some implementations, the first SI may include one or more elements of a System Information Block 1 (SIB1) message. In some implementations, the first SI may include one or more elements of a Master Information Block (MIB) message. In some implementations, the processing system may be further configured to determine whether the second SI is on-demand SI based on the first SI. In such configurations, the processing system may be further configured to determine the factor for reducing a probability that a request for the second SI will collide with a request from another wireless device for the second SI in response to determining that the second SI is on-demand SI.

In some implementations, the processing system may be further configured to determine an RBO time for sending a request for the second SI, and send the request for the second SI using the determined RBO time. In some implementations, the processing system may be further configured to determine an access barring class for the wireless device, and send the request for the second SI according to the determined access barring class. In some implementations, the processing system may be further configured to determine a factor for reducing a probability that a request for the second SI will collide with a request from another wireless device for the second SI.

Another innovative aspect of the subject matter described in this disclosure can be implemented in an apparatus of a wireless device. Some implementations of the wireless device may include a first interface configured to obtain network configuration information in a first SI, and a processing system coupled to the first interface and configured to determine from the network configuration information a type of access channel request to send to a base station, send to the base station one or more first requests for second SI based on the determined type of access channel request, determine whether an access channel request failure has occurred after sending at least one of the first requests for second SI, determine an RBO time for sending a second access channel request based on the determined type of access channel request in response to determining that an access channel request failure has occurred, and send to the base station a second request for the second SI based on the RBO time.

In some implementations, the type of access channel request may include one of a Message-1 single resource request, a Message-1 multiple resource request, and a Message-3 request. In some implementations, the processing system may be further configured to send to the base station a plurality of access channel requests based on the determined type of access channel request, and determine that an access channel request failure has occurred after sending any of the plurality of access channel requests. In some implementations, the processing system may be further configured to identify one or more messages of the second SI that the wireless device did not receive, and send to the base station a request for the one or more messages of the second SI that the wireless device did not receive using the RBO time.

In some implementations, the processing system may be further configured to determine whether a time for receiving the second SI has elapsed, and send to the base station a third request for the second SI in response to determining that the time for receiving the second SI has elapsed. In some implementations, the processing system may be further configured to monitor for the second SI based on the one or more first requests for the second SI, and determine that the access channel request failure has occurred based on a failure to receive at least one element of the second SI. In some implementations, the processing system may be further configured to monitor for the second SI requested by another wireless device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
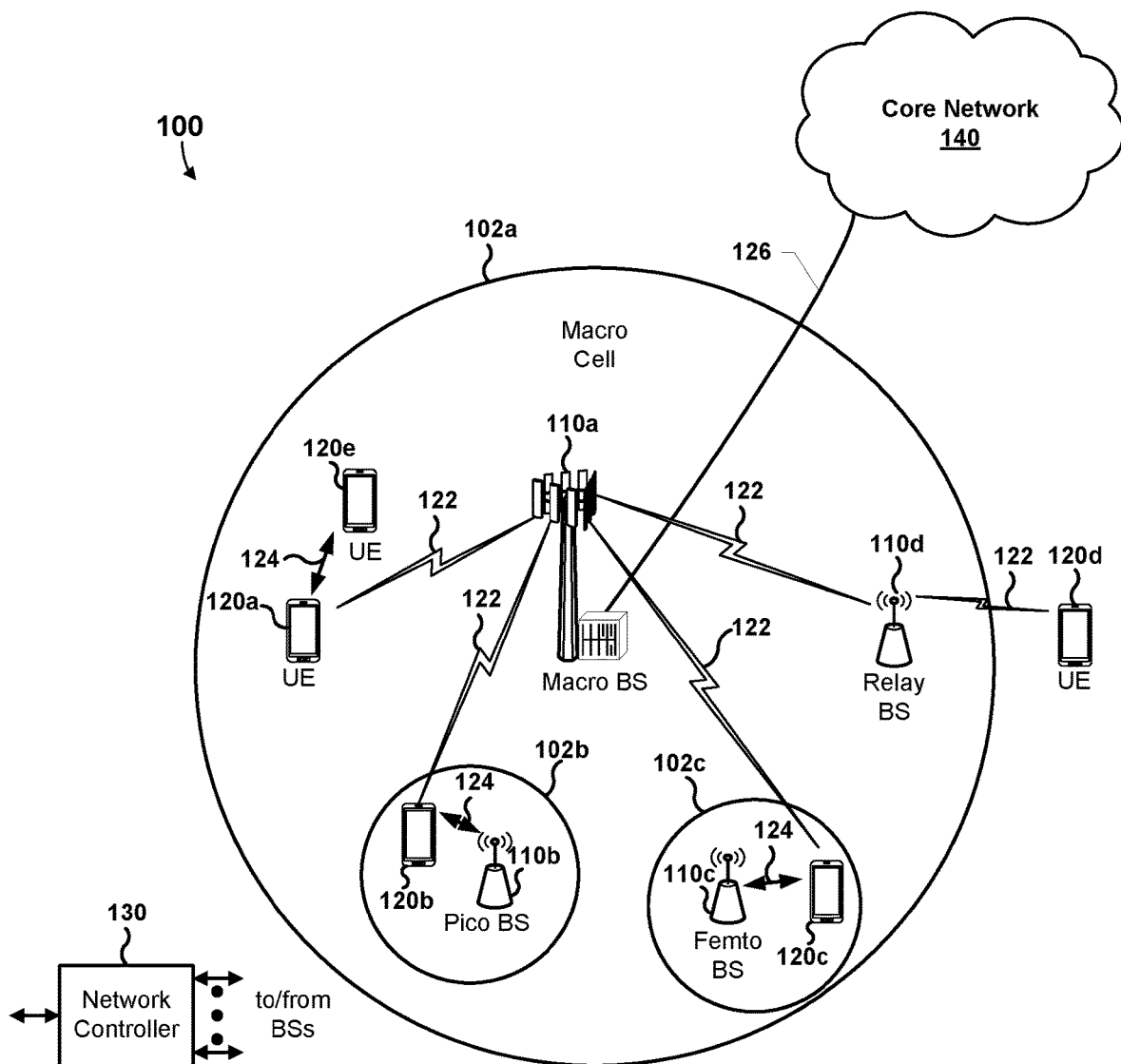
FIG. 1A shows a block diagram illustrating an example communication system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

Certain base stations implementing 5G NR communication protocols may be configured to broadcast a reduced amount of system information (SI). Such base stations may be configured to provide additional SI in response to a request from a wireless device. The SI is critical for wireless devices to establish communication with the base station. However, numerous wireless devices requesting on-demand SI from the base station may cause an increase in wireless communication link congestion as the base station responds to multiple requests to broadcast the on-demand SI.

The implementations described herein provide methods for managing wireless devices to enable the acquisition of SI required to communicate with the base station while also decreasing wireless signaling congestion and wireless communication links. In one aspect, a wireless device that is performing a procedure for managing communication with a base station may receive from the base station a SI change indication in first SI. The wireless device may determine scheduling information of second SI from the first SI. The wireless device may determine a factor that a request for the second SI will collide with a request from another wireless device for the second SI. The factor may be a factor for reducing the probability that the request for the second SI will collide with the request from the other wireless device for the second SI. Using the determined factor, the wireless device may send the request for the second SI to the base station.

In some implementations, the first SI may include one or more elements of a System Information Block 1 (SIB1) message. In some implementations, the first SI may include one or more elements of a Master Information Block (MIB) message.

In some implementations, the wireless device may determine whether the second SI is on-demand SI based on the first SI. In some implementations, the wireless device may determine the factor for reducing the probability that a request for the second SI will collide with a request from another wireless device for the second SI in response to determining that the second SI is on-demand SI.

In some implementations, the wireless device may determine a random back off (RBO) time for sending a request for the second SI, and may send the request for the second SI using the determined RBO time. In some implementations, the wireless device may determine an access barring class for the wireless device, and may send the request for the second SI according to the determined access barring class.

In some implementations, a wireless device that is performing a procedure for managing communication with a base station may receive from the base station network configuration information in first SI, and may determine from the network configuration information a type of access channel request to send to the base station. The wireless device may send to the base station a number of requests for second SI based on the determined type of access channel request. The wireless device may determine that an access channel request failure has occurred after sending at least one of the requests for the second SI. In some implementations, the wireless device may determine an RBO time for sending a second access channel request based on the determined type of access channel request, and may send to the base station the second request for the second SI using on the RBO time. In some implementations, the type of access channel request may include one of a Message-1 single resource request, a Message-1 multiple resource request, and a Message-3 request.

In some implementations, the wireless device may send to the base station a plurality of access channel requests based on the determined type of access channel request, and may determine that an access channel request failure has occurred after sending any of the plurality of access channel requests. In some implementations, the wireless device may identify one or more messages of the second SI that the wireless device did not receive. The wireless device may use the RBO time to schedule sending to the base station a request for the one or more messages of the second SI that the wireless device did not receive.

In some implementations, the wireless device may determine that a time for receiving the second SI has elapsed, and may send to the base station a third request for the second SI. In some implementations, the wireless device may monitor for the second SI based on the requests for the second SI, and may determine that the access channel request failure has occurred based on a failure to receive at least one element of the second SI. In some implementations, the wireless device may monitor for the second SI that has been requested by another wireless device.

Particular implementations of the subject matter described in this disclosure can be implemented to realize one or more of the following potential advantages. This disclosure may provide improved techniques for managing communications between a base station and one or more wireless devices. For example, the techniques may be used for managing the provisioning of SI from the base station to the one or more wireless devices. Additionally, the techniques may provide improved for increasing communication efficiency and decreasing wireless communication link congestion between the base station and the one or more wireless devices.

The term "wireless device" is used herein to refer to any one or all of wireless router devices, wireless appliances, cellular telephones, smartphones, portable computing devices, personal or mobile multi-media players, laptop computers, tablet computers, smartbooks, palmtop computers, wireless electronic mail receivers, multimedia Internet-enabled cellular telephones, wireless gaming controllers, wireless-network enabled Internet of Things (IoT) devices including large and small machinery and appliances for home or enterprise use, wireless communication elements within autonomous and semiautonomous vehicles, wireless devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "processing system" is used herein to refer to a processor, an SOC, or an SIP, coupled to or including a memory device.

The term "multicore processor" may be used herein to refer to a single integrated circuit (IC) chip or chip package that contains two or more independent processing cores (such as CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

FIG. 1A illustrates an example of a communications system 100 that is suitable for implementing various implementations. The communications system 100 may be a 5G NR network, or any other suitable network such as an LTE network.

The communications system 100 may include a heterogeneous network architecture that includes a communication network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The communications system 100 also may include relay stations (such as relay BS 110d). A relay station is an entity that can receive a transmission of data from an upstream station (for example, a base station or a mobile device) and send a transmission of the data to a downstream station (for example, a wireless device or a base station). A relay station also may be a wireless device that can relay transmissions for other mobile devices. In the example illustrated in FIG. 1, a relay station 110d may communicate with the macro base station 110a and the wireless device 120d in order to facilitate communication between the macro base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The mobile devices 120a, 120b, 120c may be dispersed throughout communications system 100, and each wireless device may be stationary or mobile. A wireless device also may be referred to as an access terminal, a terminal, a mobile station, a subscriber unit, a station, etc. A wireless device 120*a*, 120*b*, 120*c* may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

A macro base station 110*a* may communicate with the communication network 140 over a wired or wireless communication link 126. The wireless devices 120*a*, 120*b*, 120*c* may communicate with a base station 110*a*-110*d* over wireless communication links 122.

Wired communication links may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links 122, 124 may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may depend on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to two streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. The wireless device 120 may be included inside a housing that houses components of the wireless device 120, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some implementations, two or more mobile devices 120a-e (for example, illustrated as the wireless device 120a and the wireless device 120e) may communicate directly using one or more sidelink channels 124 (for example, without using a base station 110a-d as an intermediary to communicate with one another). For example, the mobile devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a-d.

Figure 1B:
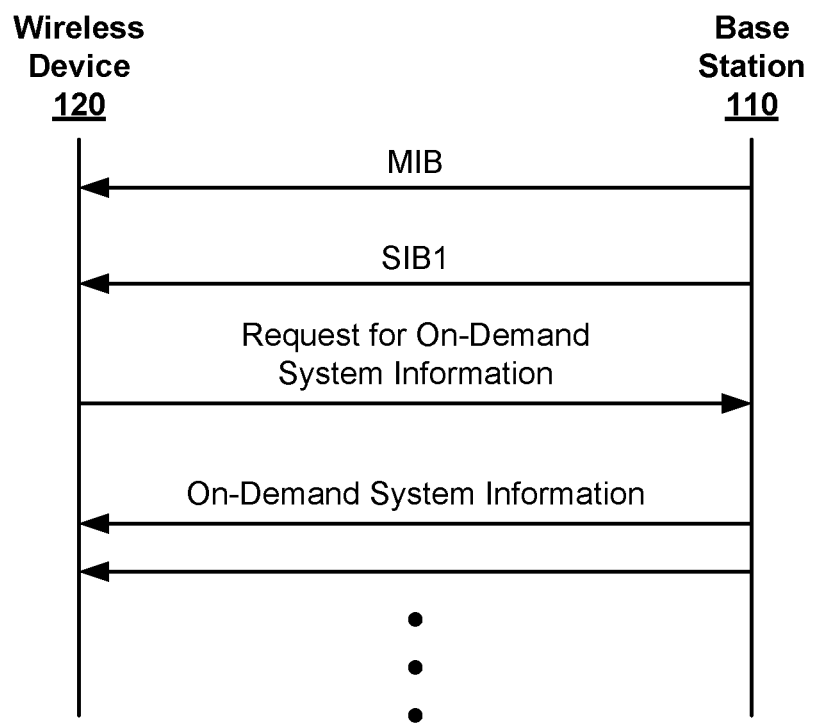
FIG. 1B shows a data flow diagram illustrating an example of system information provisioning.

FIG. 1B illustrates an example of SI provisioning. To establish communication with a base station 110, a wireless device 120 may attempt to acquire SI from the base station 110. SI may be provided in one or more system information blocks, such a Master Information Block (MIB) and one or more System Information Blocks (SIBs). SI provides timing and structure information that enables the wireless device 120 to receive and decode further information from the base station 110 that enables the wireless device 120 for example, to access communications through the base station 110, cell access, to perform cell reselection, intra-frequency, inter-frequency and inter-RAT cell selection procedures, and other operations.

In 5G NR, certain system information, such as the MIB and a SIB1 message, are broadcast by a base station. In some implementations, additional SI may be broadcast as well. However, in some implementations, the additional SI (such as on-demand SI) may be transmitted by the base station in response to a request for the additional SI (such as a request for the on-demand SI). In some implementations, the broadcast SI (that is, the MIB or SIB1 messages) may include scheduling information to enable the wireless device 120 to request and receive the on-demand SI.

When a wireless device 120 is powered on, the wireless device 120 may perform a cell search and acquire one or more synchronization signals (such as a Primary Synchronization Signal (PSS) and a Secondary Synchronization Signal (SSS)) and a Physical Broadcast Channel (PBCH) from a base station 110. Using the synchronization signal(s) and information from the PBCH the wireless device 120 may receive, decode and store MIB message(s) from the base station 110. Using parameters from the decoded MIB, the wireless device 120 may receive and decode the SIB1 message. In some implementations, the SIB1 message may indicate that the base station 110 is configured to provide one or more on-demand SI messages. To acquire the on-demand SI messages, the wireless device 120 may send a request to the base station 110 for the one or more on-demand SI messages. In some implementations, sending the request for the one or more on-demand v messages may be part of a Random Access Channel (RACH) request procedure.

Figure 2:
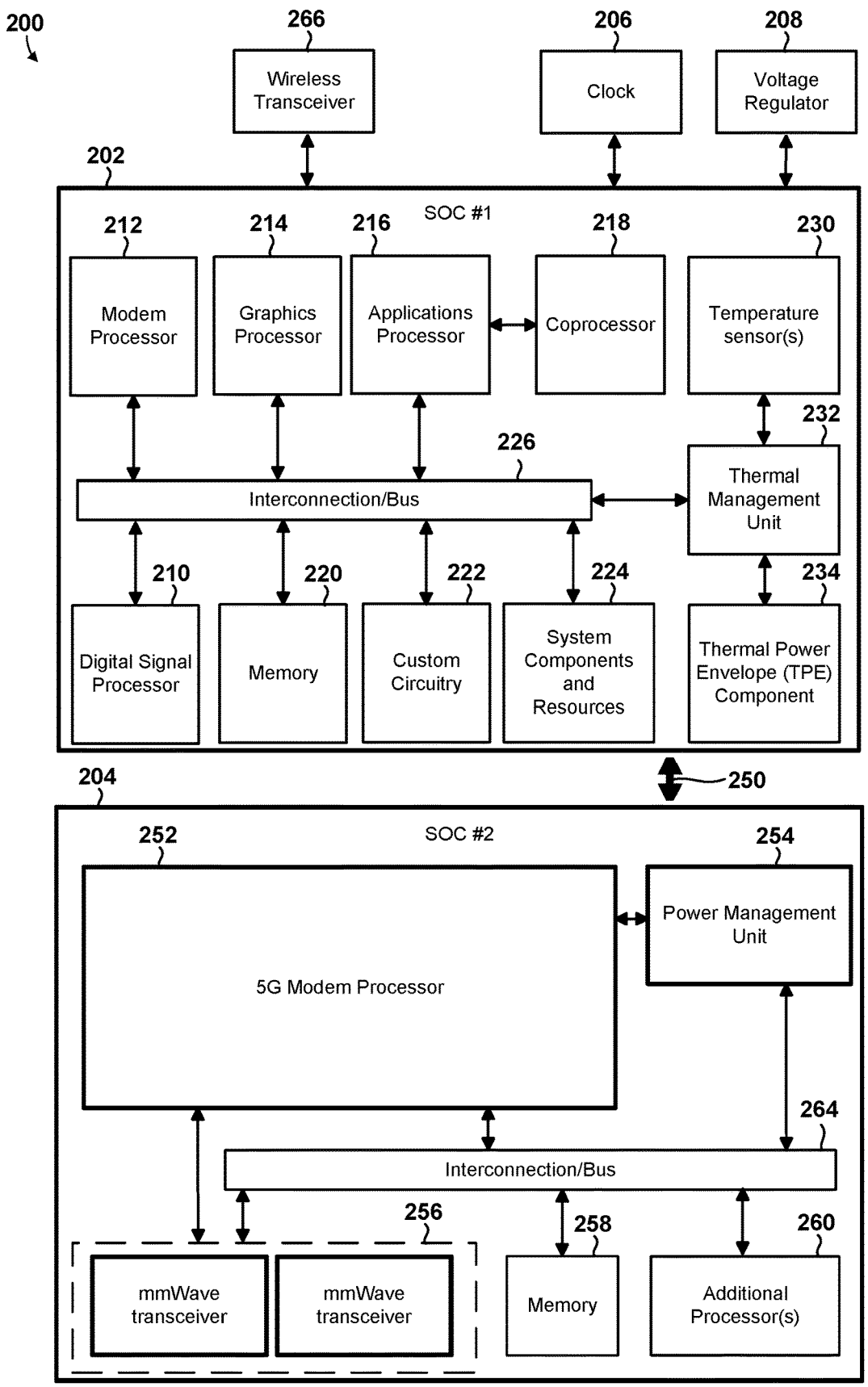
FIG. 2 shows a component block diagram of an example computing system.

FIG. 2 illustrates an example computing system or SIP 200 architecture that may be used in wireless devices implementing the various implementations. With reference to FIGS. 1A-2 the illustrated example computing system 200 (which may be an SIP in some implementations) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz millimeter wave (mmWave) spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
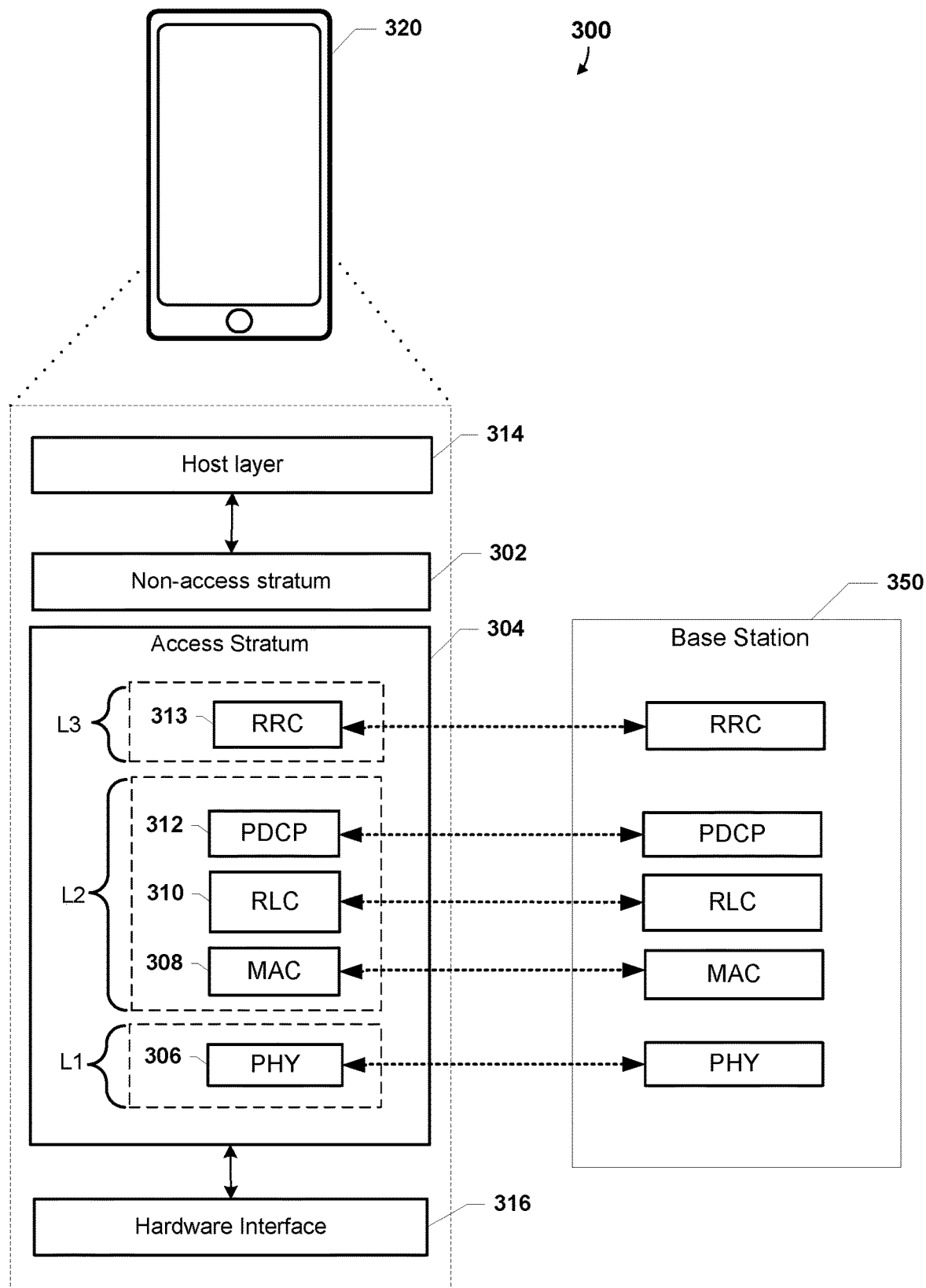
FIG. 3 shows a component block diagram of an example software architecture including a radio protocol stack for the user and control planes in wireless communications.

FIG. 3 illustrates an example of a software architecture 300 including a radio protocol stack for the user and control planes in wireless communications between a base station 350 (such as the base station 110a) and a wireless device 320 (such as the wireless devices 102a-e, 200). With reference to FIGS. 1A-3, the wireless device 320 may implement the software architecture 300 to communicate with the base station 350 of a communication system (such as 100). In various implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions including broadcasting system information, paging, and establishing and releasing an RRC signaling connection between the wireless device 320 and the base station 350.

In various implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more RF transceivers).

Figure 4:
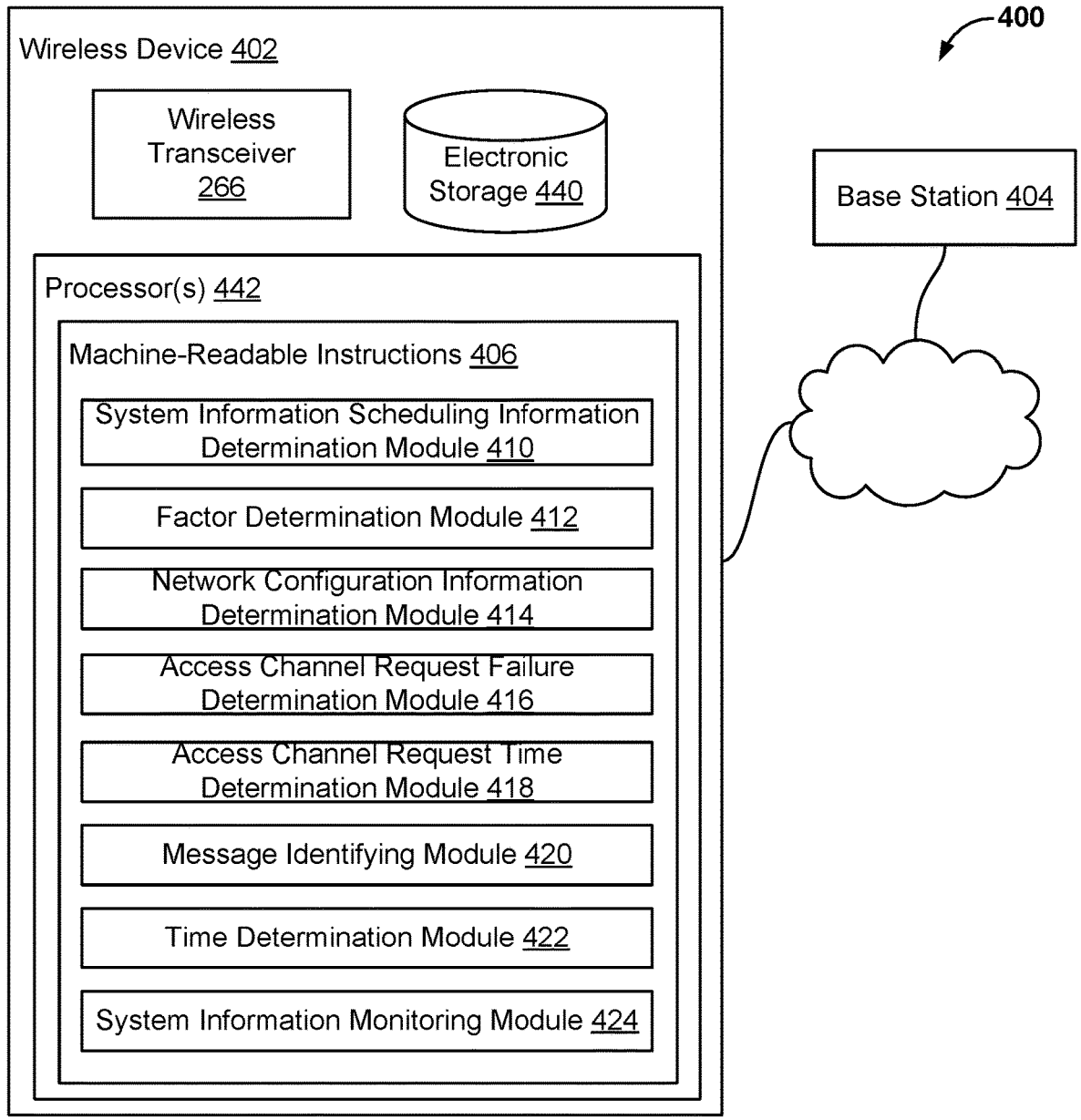
FIG. 4 shows a component block diagram of an example system configured for managing paging monitoring by a processor of a wireless device.

FIG. 4 is a component block diagram illustrating a system 400 configured for managing communication with a base station by a processor of a wireless device. With reference to FIGS. 1A-4, the system 400 may include a wireless device 402 (for example, 120a-120e, 200, 320) and a base station 404 (for example, 110a-110d, 200, 350).

The wireless device 402 may be configured by machine-readable instructions 406. Machine-readable instructions 406 may include one or more instruction modules. The instruction modules may include computer program modules. The instruction modules may include one or more of a SI scheduling information determination module 410, a factor determination module 412, a network configuration information determination module 414, an access channel request failure determination module 416, an access channel request determination module 418, a message identifying module 420, a time determination module 422, a SI monitoring module 424, and other instruction modules.

The SI scheduling information determination module 410 may be configured to determine from the first SI scheduling information of second SI.

The factor determination module 412 may be configured to determine a factor for reducing the probability that a request for the second SI will collide with a request from another wireless device for the second SI. In some implementations, the factor determination module 412 may be configured to-determine an RBO time for sending a request for the second SI. In some implementations, the factor determination module 412 may be configured to determine whether the second SI is on-demand SI based on the first SI. In some implementations, the factor determination module 412 may be configured to determine an access barring class for the wireless device.

The network configuration information determination module 414 may be configured to determine from the network configuration information a type of access channel request to send to the base station.

The access channel request failure determination module 416 may be configured to determine that an access channel request failure has occurred after sending at least one of the requests for the second SI. In some implementations, the access channel request failure determination module 416 may be configured to determine that an access channel request failure has occurred after sending any of the plurality of access channel requests. In some implementations, the access channel request failure determination module 416 may be configured to determine that the access channel request failure has occurred based on a failure to receive at least one element of the second SI.

The access channel request time determination module 418 may be configured to determine an RBO time for sending a second access channel request based on the determined type of access channel request.

The message identifying module 420 may be configured to identify one or more messages of the second SI that the wireless device did not receive.

The time determination module 422 may be configured to determine that a time for receiving the second SI has elapsed.

The SI monitoring module 424 may be configured to monitor for the second SI based on the requests for the second SI. In some implementations, the SI monitoring module 424 may be configured to monitor for the second SI requested by another wireless device.

Figure 5:
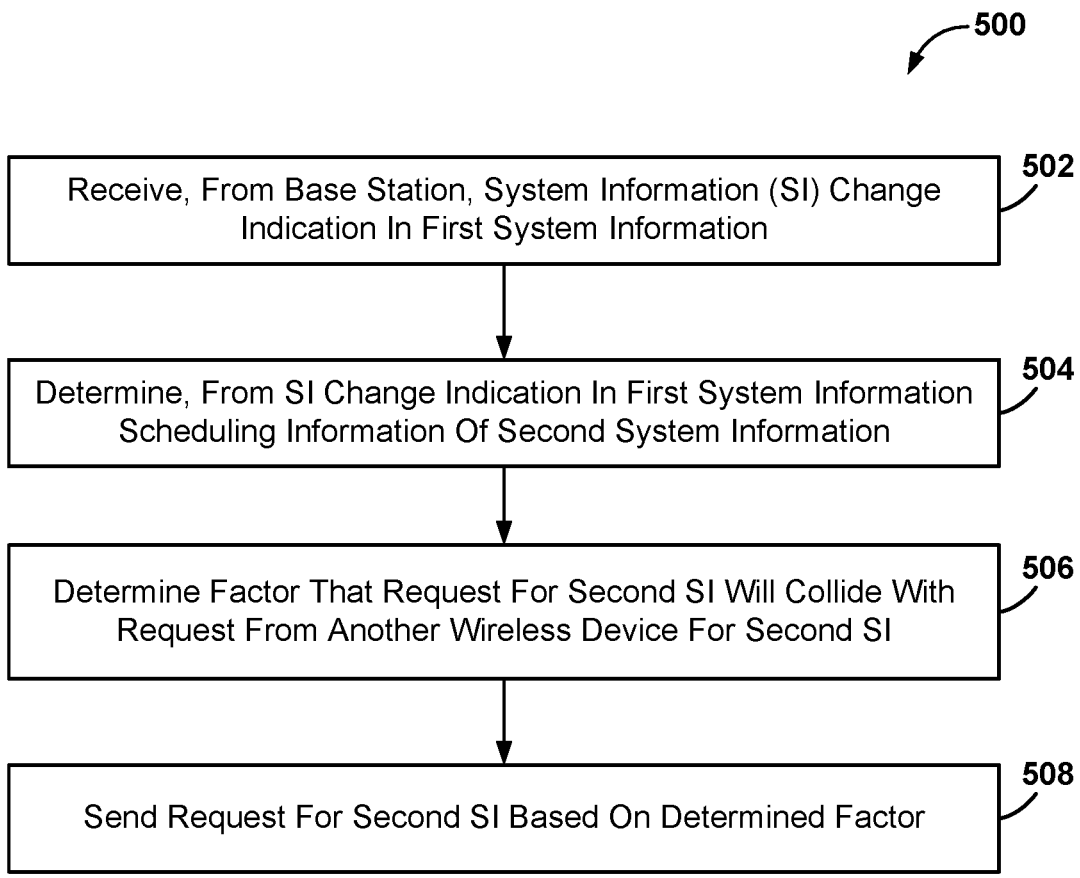
FIG. 5 shows a process flow diagram of an example method for managing communication with a base station by a processor of a wireless device.

FIG. 5 shows a process flow diagram of an example method 500 of managing communication with a base station by a processor of a wireless device. With reference to FIGS. 1-5, the method 500 may be implemented by a processor (such as the processors 212, 216, 252 or 260 depicted and described in FIG. 2) of a wireless device (such as the wireless devices 120a-120e, 200, 320 and 402 depicted and described in FIGS. 1-4).

In block 502, the processor may receive, from the base station, a SI change indication in first SI. In some implementations, the first SI may include one or more elements of a System Information Block 1 (SIB1) message. In some implementations, the first SI may include one or more elements of a Master Information Block (MIB) message. In some implementations, the first SI may include one or more elements of either or both of the MIB and SIB1 messages. In some implementations the wireless device may be configured with a first interface to receive (or otherwise obtain) the SI change indication in the first SI.

In block 504, the processor may determine, from the SI change indication in the first SI, scheduling information of second SI. In some implementations, the processor may determine from the first SI scheduling information of second SI. For example, the processor may determine scheduling information from the MIB or SIB1 messages that enables the processor to attempt to acquire on-demand SI from the base station.

In block 506, the processor may determine a factor that a request for the second SI will collide with a request from another wireless device for the second SI. In some implementations, the processor may determine a factor for reducing a probability that a request for the second SI will collide with a request from another wireless device for the second SI. In some implementations, the determined factor may include a random back off (RBO) time. In some implementations, the determined factor may include an access barring class of the wireless device.

In block 508, the processor may send the request for the second SI based on the determined factor. For example, the processor may use the random back off time to determine a time at which to send the request for the second SI. As another example, the access barring class may provide a probability factor that the processor may use to determine a time at which to send the request for the second SI. The processor may send the request for the second SI at the determined time. In some implementations the wireless device may be configured with a second interface to send (or output, or transmit) the request for the second SI based on the determined factor.

Figure 6A:
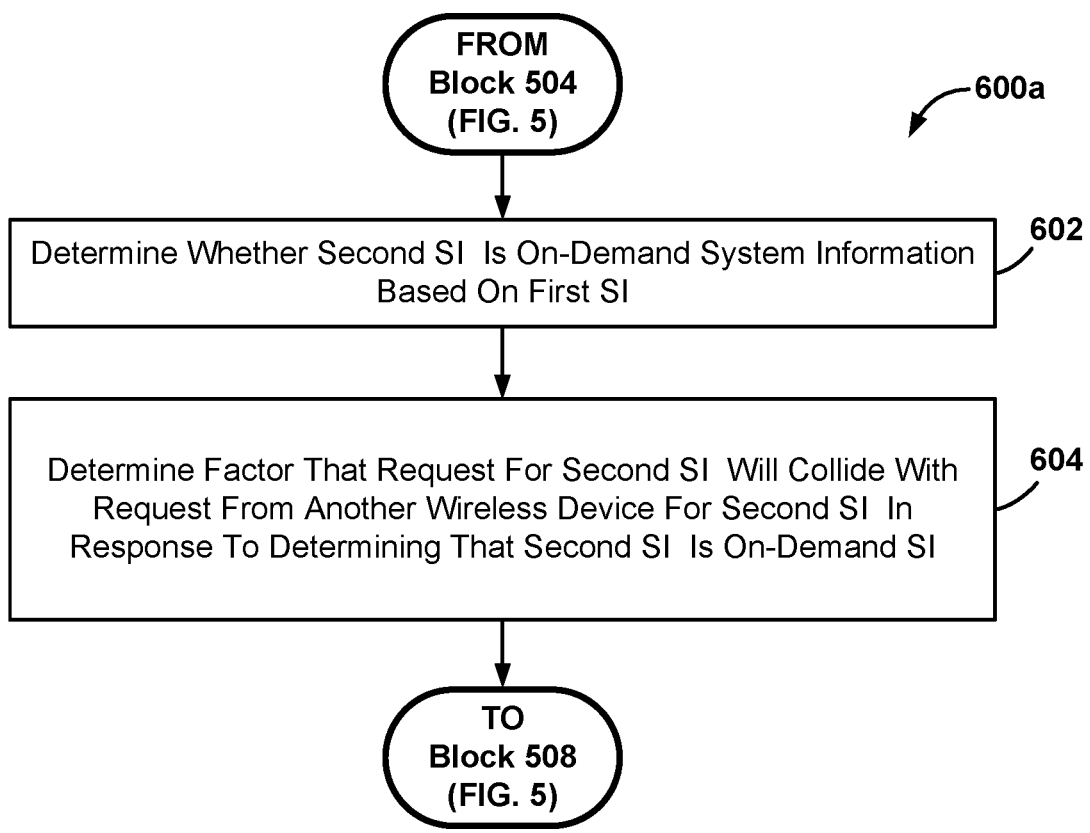
FIGS. 6A-6C show process flow diagrams of example operations that may be performed as part of the methods for managing communication with a base station by a processor of a wireless device.

FIG. 6A shows a process flow diagram of an example method 600a of managing communication with a base station by a processor of a wireless device. With reference to FIGS. 1A-6A, the method 600b may be implemented by a processor (such as 212, 216, 252 or 260 depicted and described in FIG. 2) of a wireless device (such as the wireless device 120a-120e, 200, 320, 402 depicted and described in FIGS. 1-4).

In block 602, the processor may perform operations including determining whether the second SI is on-demand SI based on the first SI.

In block 604, the processor may determine the factor that the request for second SI will collide with a request from another wireless device for the second SI in response to determining that second SI is on-demand SI. In some implementations, the factor may be a factor for reducing the probability that the request for second SI will collide with a request from another wireless device for the second SI. In some implementations, the processor may determine the factor for reducing the probability that the request for second SI will collide with a request from another wireless device for the second SI in response to determining that second SI is on-demand SI.

The processor may then perform the operations of block 508 (FIG. 5).

Figure 6B:
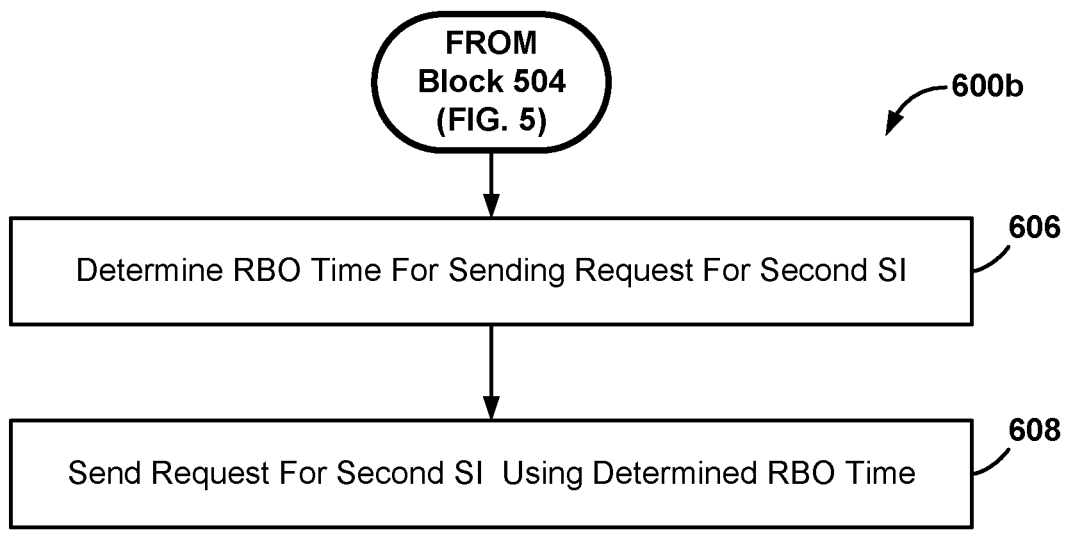

FIG. 6B shows a process flow diagram of an example method 600b of managing communication with a base station by a processor of a wireless device. With reference to FIGS. 1A-6B, the method 600b may be implemented by a processor (such as 212, 216, 252 or 260 depicted and described in FIG. 2) of a wireless device (such as the wireless device 120a-120e, 200, 320, 402 depicted and described in FIGS. 1-4).

In some implementations following the operations of block 504 (FIG. 5), the processor may determine an RBO time (for example, using a back off timer) for sending a request for the second SI in block 606. In some implementations, the processor may determine the back off time to be less than half of a current modification period of the SIB1 message. For example, certain SI (for example, si-BroadcastStatus) may indicate whether an SI message is being broadcast by the base station. In some implementations, the value of the indication is valid until the end of the broadcast control channel (BCCH) modification period when set to "broadcasting" or another suitable value. In some implementations, the modification period of the SIB1 message may be defined as the boundary at which the SIB1 message may change. In some implementations, the modification period may be computed as "modification period, expressed in number of radio frames m=modificationPeriodCoeff*defaultPagingCycle." By setting a back off timer as less than half of the SIB1 message modification period, the processor may have one or more SI occasions to read SIB messages during the remaining time. For example, if the on-demand SI RACH procedure is successful, the processor may have at least one SI occasion to read the other SI during the then-current SIB1 modification period.

In block 608, the processor may use the determined an RBO time to determine when to send the request for the second SI.

Figure 6C:
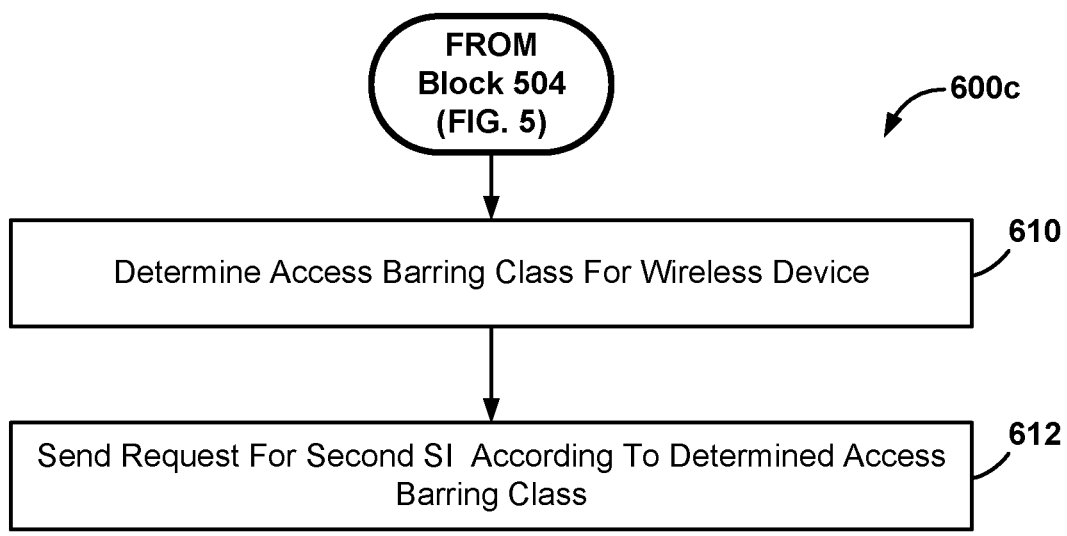

FIG. 6C shows a process flow diagram of an example method 600c of managing communication with a base station by a processor of a wireless device. With reference to FIGS. 1A-6C, the method 600c may be implemented by a processor (such as 212, 216, 252 or 260 depicted and described in FIG. 2) of a wireless device (such as the wireless device 120a-120e, 200, 320, 402 depicted and described in FIGS. 1-4).

In block 610, the processor may determine an access barring class for the wireless device. For example, the base station may be configured to provide or assign an access class to the wireless device. According to the access class, the wireless device may delay sending the request for the second SI.

In some implementations, the access class determined in block 610 may include a barring factor. In some implementations, the barring factor may include a value (for example, from 0 to 0.95 in steps of 0.05) that the wireless device may use to determine whether to send the request for the second SI. In some implementations, the processor may use the barring factor as a threshold for determining whether to send the request for the second SI. For example, the processor may generate a random number and determine whether the generated random number is above or below the barring factor. In some implementations, the access class may include a barring time. In some implementations, the processor may use the barring time as a period of time during which the processor may refrain from sending the request for the second SI.

In block 612, the processor may send the request for the second SI according to the determined access barring class.

Figure 7:
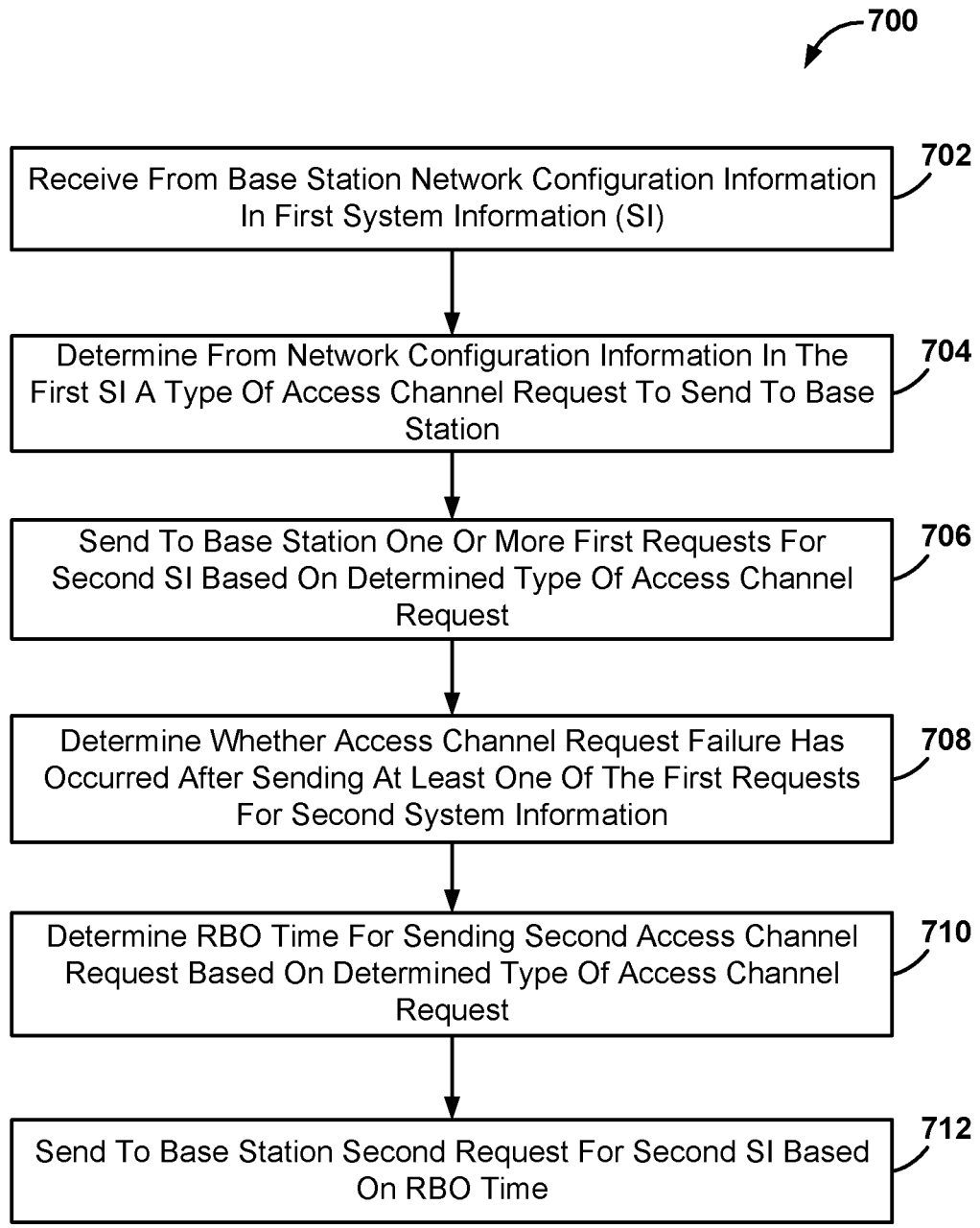
FIG. 7 shows a process flow diagram of an example method for managing communication with a base station by a processor of a wireless device.

FIG. 7 shows a process flow diagram of an example method 700 of managing communication with a base station by a processor of a wireless device. With reference to FIGS. 1A-7, the method 700 may be implemented by a processor (such as 212, 216, 252 or 260 depicted and described in FIG. 2) of a wireless device (such as the wireless device 120a-120e, 200, 320, 402 depicted and described in FIGS. 1-4).

In block 702, the processor may receive from the base station network configuration information in first system information (SI). In some implementations, the wireless device may be configured with a first interface to receive from the base station network configuration information in the first SI.

In block 704, the processor may determine, from the network configuration information in the first SI, a type of access channel request to send to the base station.

In block 706, the processor may perform send to the base station one or more first requests for second SI based on the determined type of access channel request.

In block 708, the processor may determine whether an access channel request failure has occurred after sending at least one of the first requests for the second SI.

In block 710, the processor may determine an RBO time for sending a second access channel request based on the determined type of access channel request in response to determining that an access channel request failure has occurred.

In block 712, the processor may send to the base station the second request for the second SI based on the RBO time. In other words, the processor may use the RBO time to determine when to transmit the second request for the second SI, and transmit the request at the determined time.

Figure 8A:
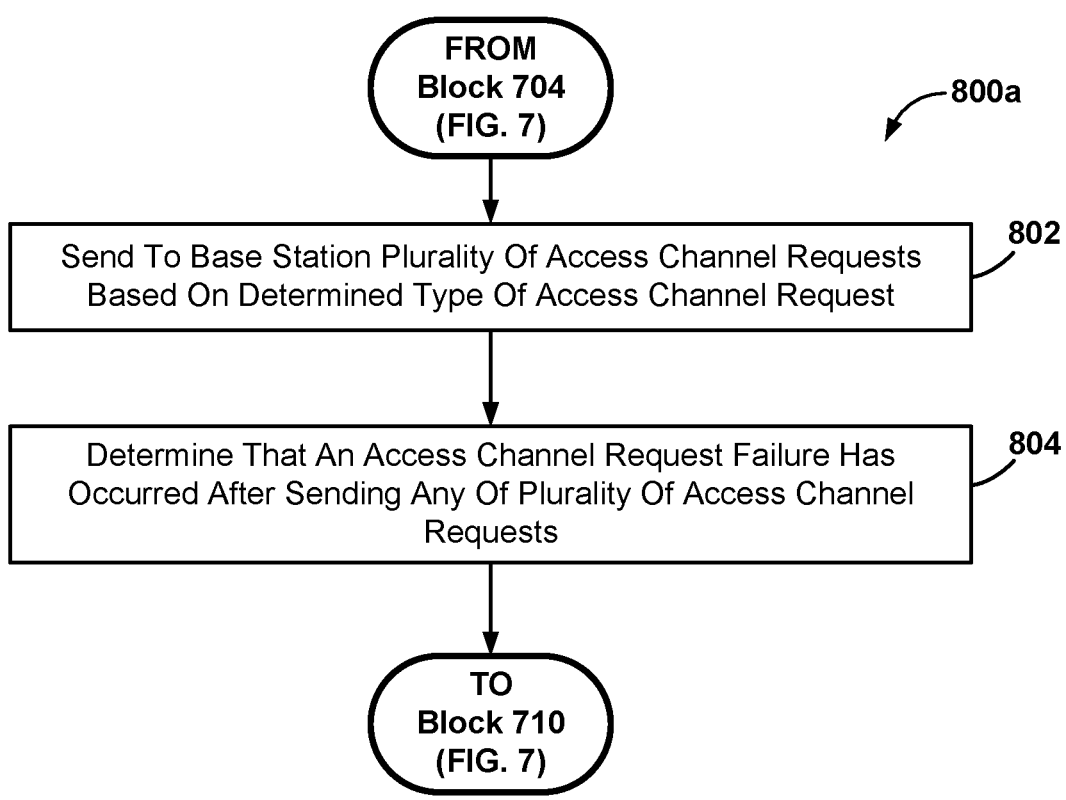
FIGS. 8A-8D show process flow diagrams of example operations that may be performed as part of the methods for managing communication with a base station by a processor of a wireless device.

FIG. 8A shows a process flow diagram of an example method 800a of managing communication with a base station by a processor of a wireless device. With reference to FIGS. 1A-8A, the method 800a may be implemented by a processor (such as 212, 216, 252 or 260 depicted and described in FIG. 2) of a wireless device (such as the wireless device 120a-120e, 200, 320, 402 depicted and described in FIGS. 1-4).

In some implementations following the operations of block 704 (FIG. 7), the processor may send to the base station a plurality of access channel requests based on the determined type of access channel request in block 802.

In block 804, the processor may determine whether an access channel request failure has occurred after sending any of the plurality of access channel requests. In some implementations, the processor may determine that a SI status indication in the SIB1 broadcast by the base station has not changed to indicate that the base station is broadcasting the second SI.

The processor may then perform the operations of block 710 (FIG. 7).

Figure 8B:
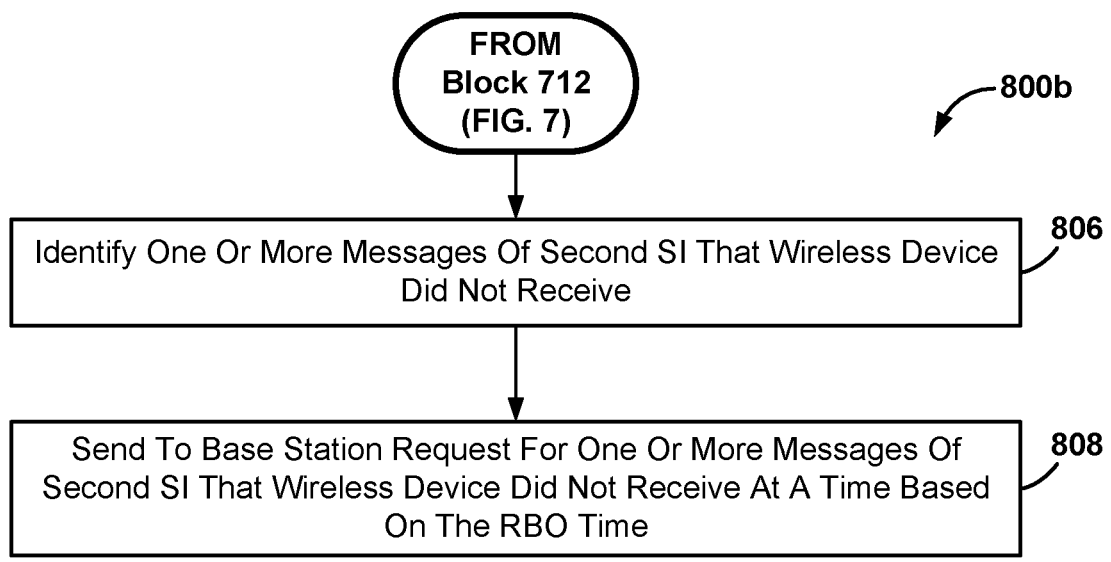

FIG. 8B shows a process flow diagram of an example method 800b of managing communication with a base station by a processor of a wireless device. With reference to FIGS. 1A-8B, the method 800b may be implemented by a processor (such as 212, 216, 252 or 260 depicted and described in FIG. 2) of a wireless device (such as the wireless device 120a-120e, 200, 320, 402 depicted and described in FIGS. 1-4).

In some implementations following the operations of block 712 (FIG. 7), the processor may identify one or more messages of the second SI that the wireless device did not receive in block 806. In some implementations, the processor may determine or detect that, after sending of the second request for the second SI, one or more messages of the second SI still have not been received. In some implementations, the processor may determine that a SI status indication in the SIB1 broadcast by the base station has not changed to indicate that the base station is broadcasting the second SI.

In block 808, the processor may send to the base station a request for the one or more messages of the second SI that the wireless device did not receive at a time based on the RBO time.

Figure 8C:
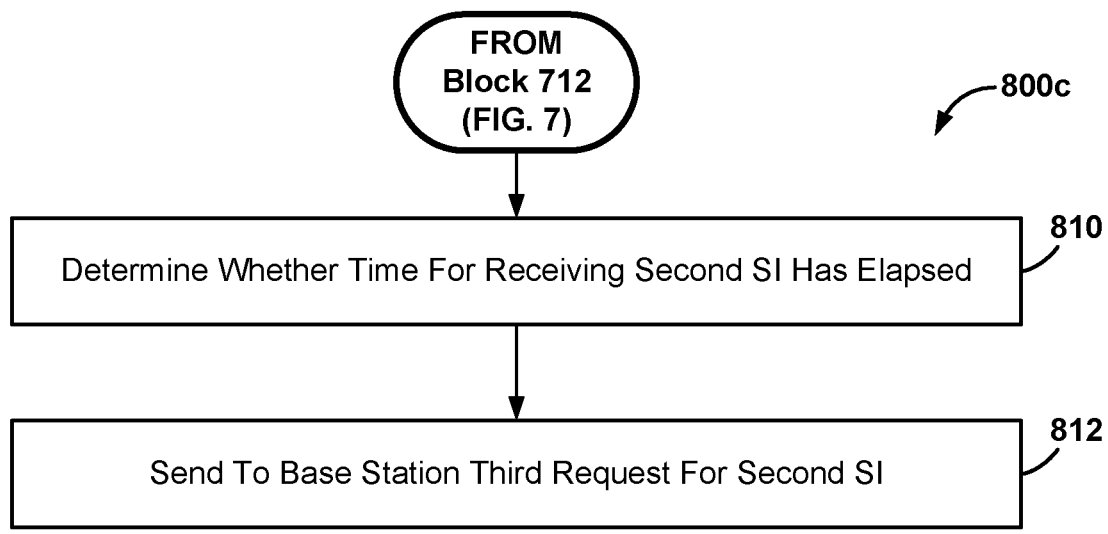

FIG. 8C shows a process flow diagram of an example method 800c of managing communication with a base station by a processor of a wireless device. With reference to FIGS. 1A-8C, the method 800c may be implemented by a processor (such as 212, 216, 252 or 260 depicted and described in FIG. 2) of a wireless device (such as the wireless device 120a-120e, 200, 320, 402 depicted and described in FIGS. 1-4).

In some implementations following the operations of block 712 (FIG. 7), the processor may determine whether a time for receiving the second SI has elapsed in block 810. In some implementations, the processor may determine that a time period for receiving the second SI, such as a read timer, has expired.

In block 812, the processor may send to the base station a third request for the second SI. In some implementations, the processor may restart a random access channel (RACH) request procedure. In some implementations, the processor may send to the base station the third request for the second SI in response to determining that the time for receiving the second SI has elapsed.

Figure 8D:
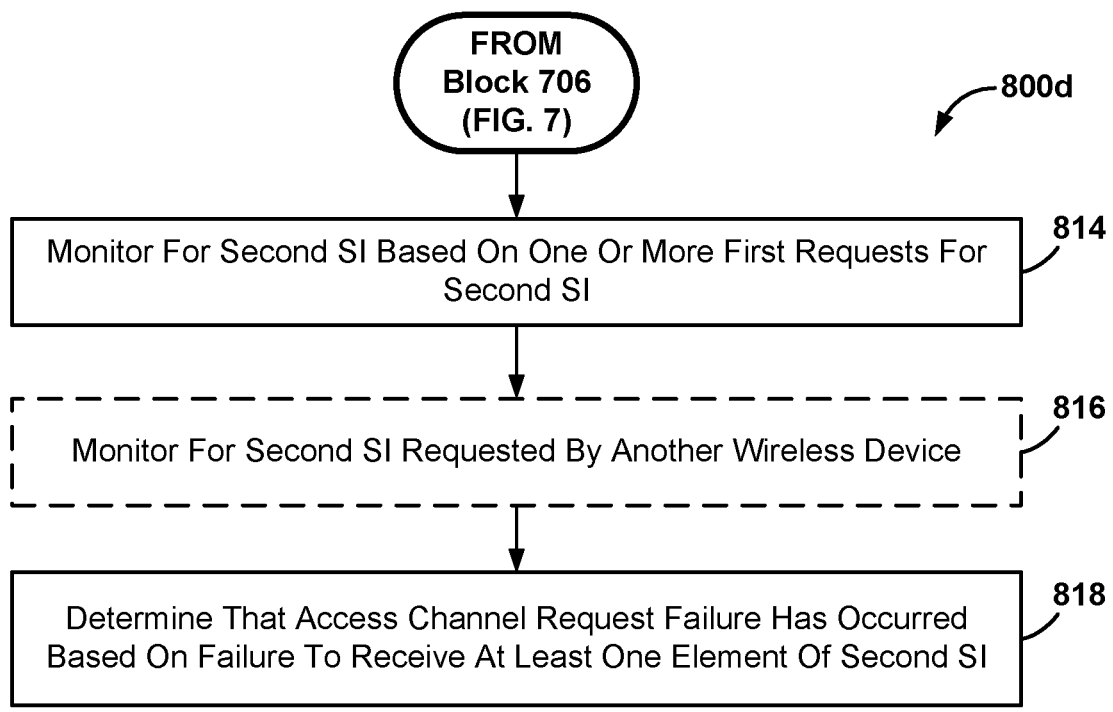

FIG. 8D shows a process flow diagram of an example method 800d of managing communication with a base station by a processor of a wireless device. With reference to FIGS. 1A-8D, the method 800d may be implemented by a processor (such as 212, 216, 252 or 260 depicted and described in FIG. 2) of a wireless device (such as the wireless device 120a-120e, 200, 320, 402 depicted and described in FIGS. 1-4).

In some implementations following the operations of block 706 (FIG. 7), the processor may perform operations including monitoring for the second SI based on the one or more first requests for the second SI in block 814.

In optional block 816, the processor may monitor for the second SI requested by another wireless device.

In block 818, the processor may determine that the access channel request failure has occurred based on a failure to receive at least one element of the second SI.

Figure 9:
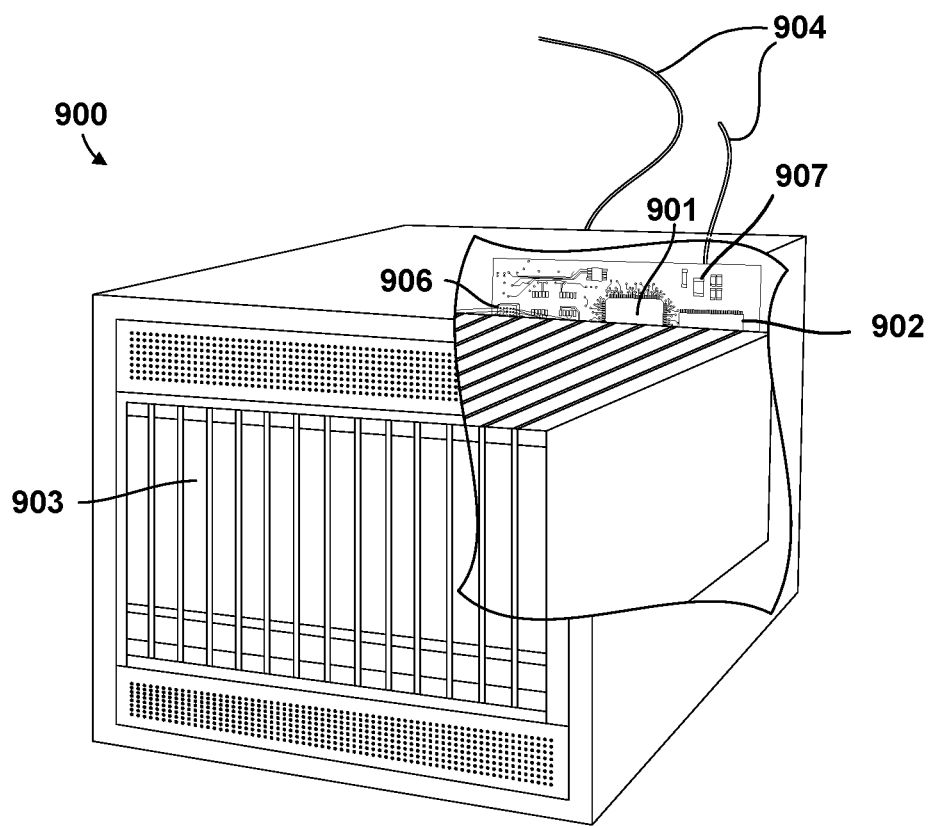
FIG. 9 shows a component block diagram of an example network computing device.

FIG. 9 shows a component block diagram of an example network computing device 900. The computing device 900 may be implemented as a base station. Such network computing devices may include at least the components illustrated in FIG. 9. With reference to FIGS. 1-9, the network computing device 900 may typically include a processor 901 coupled to volatile memory 902 and a large capacity non-volatile memory, such as a disk drive 903. The network computing device 900 also may include a peripheral memory access device such as a floppy disc drive, compact disc (CD) or digital video disc (DVD) drive 906 coupled to the processor 901. The network computing device 900 also may include network access ports 904 (or interfaces) coupled to the processor 901 for establishing data connections with a network, such as the Internet or a local area network coupled to other system computers and servers. The network computing device 900 may include one or more antennas 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

Figure 10:
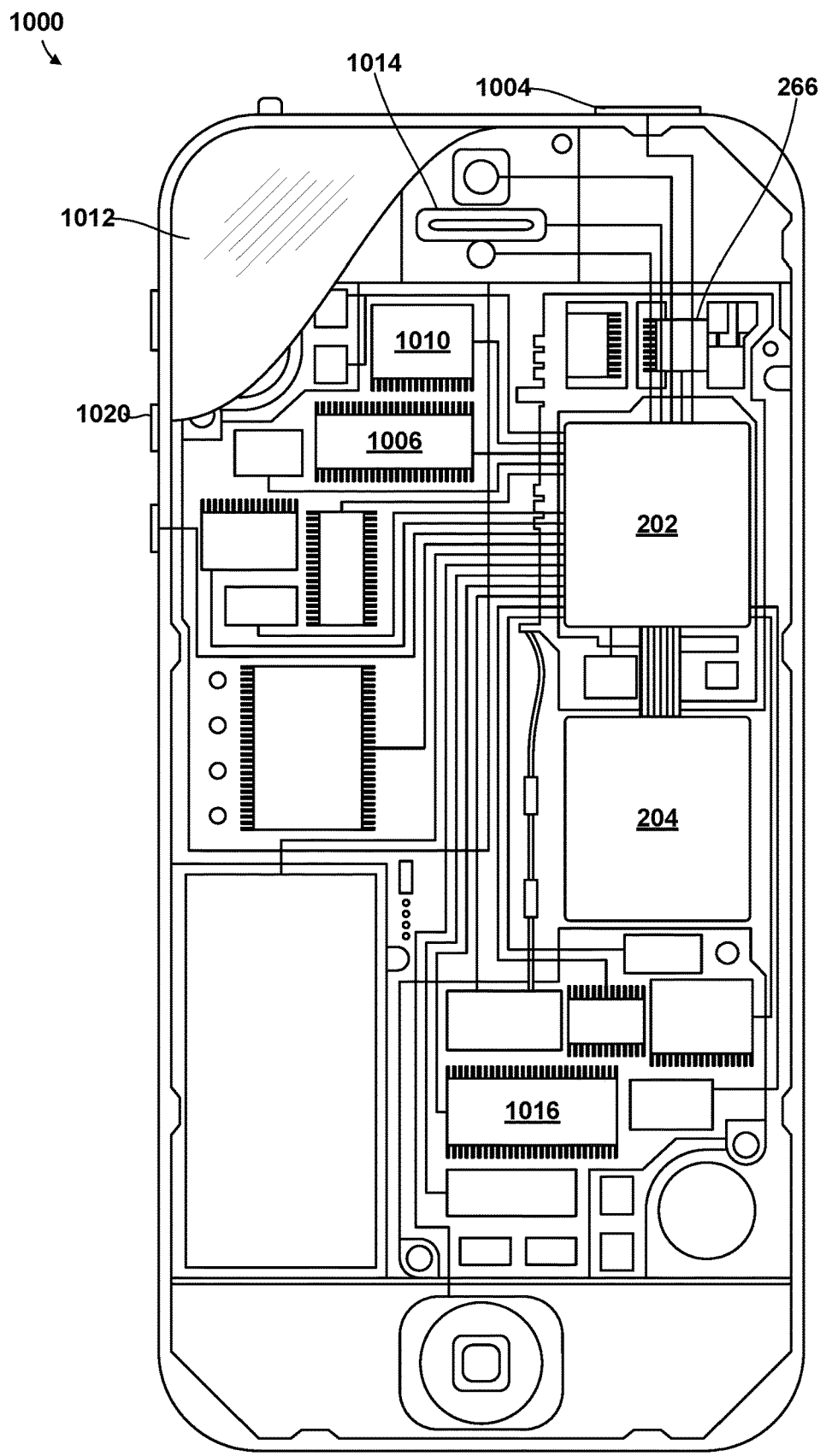
FIG. 10 shows a component block diagram of an example wireless device.

FIG. 10 shows a component block diagram of an example wireless device 1000. In various implementations, the wireless device 1000 may be similar to the wireless devices 120, 200, 320, and 402 shown in FIGS. 1-4. A wireless device 1000 may include a first SOC 202 (such as a SOC-CPU) coupled to a second SOC 204 (such as a 5G capable SOC). The first and second SOCs 202, 204 may be coupled to internal memory 1006, 1016, a display 1012, and to a speaker 1014. Additionally, a wireless device 1000 may include an antenna 1004 for sending and receiving electromagnetic radiation that may be connected to a wireless data link or cellular telephone transceiver 266 coupled to one or more processors in the first or second SOCs 202, 204. A wireless device 1000 typically also includes menu selection buttons or rocker switches 1020 for receiving user inputs.

A wireless device 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1010 may include a digital signal processor (DSP) circuit (not shown separately).

The processors of a network computing device 900 and a wireless device 1000 may be any programmable microprocessor, microcomputer or multiple processor chip or chips that can be configured by software instructions (applications) to perform a variety of functions, including the functions of the various implementations described below. In some mobile devices, multiple processors may be provided, such as one processor within an SOC 204 dedicated to wireless communication functions and one processor within an SOC 202 dedicated to running other applications. Typically, software applications may be stored in the memory 1006, 1016 before they are accessed and loaded into the processor. The processors may include internal memory sufficient to store the application software instructions.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods 500, 600a-600c, 700, and 800a-800d may be substituted for or combined with one or more operations of the methods 500, 600a-600c, 700, and 800a-800d.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a non-transitory processor-readable storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available non-transitory storage media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more aspects, the functions described may be implemented by a processor, which may be coupled to a memory. The memory may be a non-transitory computer-readable storage medium that stores processor-executable instructions. The memory may store an operating system, user application software, or other executable instructions. The memory also may store application data, such as an array data structure. The processor may read and write information to and from the memory. The memory also may store instructions associated with one or more protocol stacks. A protocol stack generally includes computer executable instructions to enable communication using a radio access protocol or communication protocol.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of managing communication with a base station by a processor of a wireless device, comprising:
receiving, from the base station, a system information (SI) change indication in first SI;
determining, from the SI change indication in the first SI, scheduling information of second SI;
determining whether the second SI is on-demand SI based on the first SI;
determining a factor that a request for the second SI will collide with a request from another wireless device for the second SI in response to determining that the second SI is on-demand SI; and
sending the request for the second SI using the determined factor.

2. The method of claim 1, wherein the first SI comprises one or more elements of a System Information Block 1 (SIB 1) message.

3. The method of claim 1, wherein the first SI comprises one or more elements of a Master Information Block (MIB) message.

4. The method of claim 1, wherein: determining a factor that a request for the second SI will collide with a request from another wireless device for the second SI comprises determining a random back off (RBO) time for sending the request for the second SI; and sending the request for the second SI using the determined factor comprises sending the request for the second SI using the determined RBO time.

5. The method of claim 1, wherein: determining a factor that a request for the second SI will collide with a request from another wireless device for the second SI comprises determining an access barring class for the wireless device; and sending the request for the second SI using the determined factor comprises sending the request for the second SI according to the determined access barring class.

6. The method of claim 1, wherein determining a factor that a request for the second SI will collide with a request from another wireless device for the second SI comprises determining the factor for reducing a probability that the request for the second SI will collide with the request from another wireless device for the second SI.

7. A method of managing communications with a base station by a processor of a wireless device, comprising:
receiving, from the base station, network configuration information in a first system information (SI);
determining, from the network configuration information in the first SI, a type of access channel request to send to the base station;
sending, to the base station, one or more first requests for second SI based on the determined type of access channel request;
determining whether an access channel request failure has occurred after sending at least one of the first requests for second SI;
determining a random back off (RBO) time for sending a second access channel request based on the determined type of access channel request in response to determining that an access channel request failure has occurred; and
sending to the base station a second request for the second SI based on the RBO time.

8. The method of claim 7, wherein the type of access channel request comprises one of a Message-1 single resource request, a Message-1 multiple resource request, and a Message-3 request.

9. The method of claim 7, wherein: sending to the base station a number of access channel requests based on the determined type of access channel request comprises sending to the base station a plurality of access channel requests based on the determined type of access channel request; and determining that an access channel request failure has occurred comprises determining that the access channel request failure has occurred after sending any of the plurality of access channel requests.

10. The method of claim 7, further comprising: identifying one or more messages of the second SI that the wireless device did not receive; and sending to the base station the request for the one or more messages of the second SI that the wireless device did not receive using the RBO time.

11. The method of claim 7, further comprising: determining whether a time for receiving the second SI has elapsed; and sending to the base station a third request for the second SI in response to determining that the time for receiving the second SI has elapsed.

12. The method of claim 7, wherein determining whether an access channel request failure has occurred after sending at least one of the first requests for the second SI comprises: monitoring for the second SI based on the one or more first requests for the second SI; and determining that the access channel request failure has occurred based on a failure to receive at least one element of the second SI.

13. The method of claim 12, wherein monitoring for the second SI based on the requests for the second SI comprises: monitoring for the second SI requested by another wireless device.

14. An apparatus of a wireless device, comprising;
a first interface configured to
obtain a system information (SI) change indication in first SI; and
a processing system coupled to the first interface and configured to:
determine, from the SI change indication in the first SI, scheduling information of second SI;
determine whether the second SI is on-demand SI based on the first SI;
determine a factor that a request for the second SI will collide with a request from another wireless device for the second SI in response to determining that the second SI is on-demand SI; and
a second interface configured to output the request for the second SI using the determined factor.

15. The apparatus of claim 14, wherein the first SI comprises one or more elements of a System Information Block 1 (SIBI) message.

16. The apparatus of claim 14, wherein the first SI comprises one or more elements of a Master Information Block (MIB) message.

17. The apparatus of claim 14, wherein the processing system is further configured to: determine a random back off (RBO) time for sending the request for the second SI; and send the request for the second SI using the determined RBO time.

18. The apparatus of claim 14, wherein the processing system is further configured to: determine an access barring class for the wireless device; and send the request for the second SI according to the determined access barring class.

19. The apparatus of claim 14, wherein the processing system is further configured to determine the factor for reducing a probability that the request for the second SI will collide with the request from another wireless device for the second SI.

20. An apparatus of a wireless device, comprising:
a first interface configured to
obtain network configuration information in a first system information (SI); and
a processing system coupled to the first interface and configured to:
determine, from the network configuration information in the first SI, a type of access channel request to send to a base station;
send to the base station one or more first requests for second SI based on the determined type of access channel request;
determine whether an access channel request failure has occurred after sending at least one of the first requests for second SI;
determine a random back off (RBO) time for sending a second access channel request based on the determined type of access channel request in response to determining that an access channel request failure has occurred; and
send to the base station a second request for the second SI based on the RBO time.

21. The apparatus of claim 20, wherein the type of access channel request comprises one of a Message-I single resource request, a Message-I multiple resource request, and a Message-3 request.

22. The apparatus of claim 20, wherein the processing system is further configured to: send to the base station a plurality of access channel requests based on the determined type of access channel request; and determine that an access channel request failure has occurred comprises determining that the access channel request failure has occurred after sending any of the plurality of access channel requests.

23. The apparatus of claim 20, wherein the processing system is further configured to: identify one or more messages of the second SI that the wireless device did not receive; and send to the base station the request for the one or more messages of the second SI that the wireless device did not receive using the RBO time.

24. The apparatus of claim 20, wherein the processing system is further configured to: determine whether a time for receiving the second SI has elapsed; and send to the base station a third request for the second SI in response to determining that the time for receiving the second SI has elapsed.

25. The apparatus of claim 20, wherein the processing system is further configured to: monitor for the second SI based on the one or more first requests for the second SI; and determine that the access channel request failure has occurred based on a failure to receive at least one element of the second SI.

26. The apparatus of claim 20, wherein the processing system is further configured to: monitor for the second SI requested by another wireless device.

* * * * *